United States Patent
Seela et al.

(10) Patent No.: US 11,120,046 B2
(45) Date of Patent: Sep. 14, 2021

(54) DATA REPLICATION IN A DISTRIBUTED STORAGE SYSTEM

(71) Applicant: Microsoft Technology Licensing, LLC, Redmond, WA (US)

(72) Inventors: Pradeep Seela, Redmond, WA (US); Pei Zhang, Sammamish, WA (US); Yongfu Lou, Redmond, WA (US); Jegan Devaraju, Redmond, WA (US); Krishnan Varadarajan, Redmond, WA (US); Yi-Fan Tsai, Bellevue, WA (US); Maneesh Sah, Sammamish, WA (US); Kristopher T. Lange, Seattle, WA (US); Shane K. Mainali, Duvall, WA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 287 days.

(21) Appl. No.: 16/360,862

(22) Filed: Mar. 21, 2019

(65) Prior Publication Data

US 2019/0340185 A1 Nov. 7, 2019

Related U.S. Application Data

(60) Provisional application No. 62/667,174, filed on May 4, 2018.

(51) Int. Cl.
*G06F 16/27* (2019.01)
*G06F 16/22* (2019.01)

(52) U.S. Cl.
CPC ........ *G06F 16/273* (2019.01); *G06F 16/2282* (2019.01)

(58) Field of Classification Search
None
See application file for complete search history.

(56) References Cited

U.S. PATENT DOCUMENTS 5,551,027 A 8/1996 Choy et al.
7,299,239 B1 11/2007 Basu et al.
(Continued)

FOREIGN PATENT DOCUMENTS

EP 1400899 A2 3/2004
WO 2006094366 A1 9/2006

OTHER PUBLICATIONS

"Notice of Allowance Issued in U.S. Appl. No. 16/279,797", dated Jul. 21, 2020, 12 Pages.
(Continued)

*Primary Examiner* — Kim T Nguyen
(74) *Attorney, Agent, or Firm* — Mannava & Kang, P.C.

(57) ABSTRACT

Data is replicated between primary and secondary storage systems using a data pulling process or a log shipping process. If data is to be replicated through the log shipping process, a transaction and its associated data get stored in a transaction log in the secondary storage system. Subsequently, when the transaction gets executed, actual data gets persisted from the transaction log to a data log in the secondary storage system. If the data is to be replicated through the data pulling process, the transaction is stored in the transaction log. However, the associated data for the transaction is retrieved from the first primary storage system and stored directly in the data log in the secondary system.

17 Claims, 10 Drawing Sheets

(56) References Cited

U.S. PATENT DOCUMENTS

| | | | |
|---|---|---|---|
| 7,685,109 | B1 | 3/2010 | Ransil et al. |
| 7,743,210 | B1 | 6/2010 | Jernigan et al. |
| 8,069,141 | B2 | 11/2011 | Wetmore et al. |
| 8,121,978 | B2 * | 2/2012 | Wiss ................... G06F 11/2071 707/615 |
| 8,135,930 | B1 | 3/2012 | Mattox et al. |
| 8,495,036 | B2 | 7/2013 | Calder et al. |
| 8,620,884 | B2 | 12/2013 | Calder et al. |
| 9,501,364 | B1 | 11/2016 | Bushman et al. |
| 9,736,243 | B2 | 8/2017 | Chablani et al. |
| 9,798,620 | B2 | 10/2017 | Wood et al. |
| 9,916,325 | B2 * | 3/2018 | Hildebrand ............ G06Q 10/00 |
| 2006/0112222 | A1 | 5/2006 | Barrall |
| 2010/0106695 | A1 | 4/2010 | Calder et al. |
| 2011/0066592 | A1 | 3/2011 | Newport et al. |
| 2012/0084260 | A1 | 4/2012 | Cherkauer et al. |
| 2013/0268488 | A1 | 10/2013 | Jackiewicz et al. |
| 2015/0301934 | A1 | 10/2015 | Baderdinni et al. |
| 2015/0347551 | A1 * | 12/2015 | Shang ................... G06F 16/273 707/615 |
| 2016/0041906 | A1 | 2/2016 | Mukherjee et al. |
| 2016/0092464 | A1 * | 3/2016 | Hildebrand ......... G06F 16/1805 707/648 |
| 2016/0092468 | A1 * | 3/2016 | Hildebrand ............ G06Q 10/00 707/633 |
| 2016/0140202 | A1 | 5/2016 | Calder et al. |
| 2016/0147859 | A1 | 5/2016 | Lee et al. |
| 2017/0024142 | A1 | 1/2017 | Watanabe et al. |
| 2017/0161350 | A1 | 6/2017 | Calder et al. |
| 2017/0228411 | A1 * | 8/2017 | Cadarette ............ G06F 16/2315 |
| 2017/0351585 | A1 * | 12/2017 | Bourbonnais ........... G06F 16/27 |
| 2018/0046551 | A1 | 2/2018 | Bourbonnais et al. |
| 2018/0089223 | A1 * | 3/2018 | Hildebrand ......... G06F 16/1844 |
| 2019/0339886 | A1 | 11/2019 | Devaraju et al. |
| 2019/0340185 | A1 * | 11/2019 | Seela ................... G06F 16/273 |

OTHER PUBLICATIONS

"Non-Final Office Action Issued in U.S. Appl. No. 16/279,797", dated Feb. 10, 2020, 21 Pages.

"Database VLDB and Partitioning Guide", Retrieved From: https://web.archive.org/web/20161108115612/https:/docs.oracle.com/cd/E11882_01/server.112/e25523/part_admin001.htm, Nov. 8, 2016, 16 Pages.

"How Data Partitioning in Spark Helps Achieve More Parallelism?", Retrieved From: https://www.dezyre.com/article/how-data-partitioning-in-spark-helps-achieve-more-parallelism/297, Aug. 26, 2016, 6 Pages.

"Veeam Backup & Replication 9.5", Retrieved From: https://helpcenter.veeam.com/archive/backup/95/vsphere/sql_backup_job.html, Retrieved On: Jan. 10, 2019, 2 Pages.

Calder, et al., "Windows Azure Storage: A Highly Available Cloud Storage Service with Strong Consistency", In Proceedings of the Twenty-Third ACM Symposium on Operating Systems Principles, Oct. 23, 2011, 26 Pages.

Chen, et al., "Non Provisional Application Filed in U.S. Appl. No. 15/957,386", filed Apr. 19, 2018, Pages.

Curino, et al., "Schism: a Workload-Driven Approach to Database Replication and Partitioning", In Proceedings of the VLDB Endowment, vol. 3, Issue 1-2, Sep. 1, 2010, pp. 48-57.

Lejeune Jr., David W., "Adaptive Partitioning and its Applicability to a Highly Scalable and Available Geo-Spatial Indexing Solution", In Journal of Computing Research Repository, Mar. 2013, 7 Pages.

Pavliashvili, Baya, "Log Shipping a Replicated Database", Retrieved From: https://searchsqlserver.techtarget.com/tip/Log-shipping-a-replicated-database, Aug. 2005, 4 Pages.

Ross, et al., "Optimal Splitters for Database Partitioning with Size Bounds", In Proceedings of the 12th International Conference on Database Theory, Mar. 23, 2009, 13 Pages.

Roth, et al., "About Log Shipping (SQL Server)", Retrieved From: https://docs.microsoft.com/en-us/sql/database-engine/log-shipping/about-log-shipping-sql-server?view=sql-server-2017#ComponentsAndConcepts, May 17, 2016, 6 Pages.

"International Search Report and Written Opinion Issued in PCT Application No. PCT/US2019/026989", dated Jul. 10, 2019, 17 Pages.

"International Search Report and Written Opinion Issued in PCT Application No. PCT/US2019/029510", dated Jul. 23, 2019, 13 Pages.

Sobe, Peter, "Adaptations of Block Layout in Distributed Storage Systems", In Proceedings 14th Euromicro International Conference on Parallel, Distributed, and Network-Based Processing, Feb. 15, 2006, 10 Pages.

* cited by examiner

DATA REPLICATION IN A DISTRIBUTED STORAGE SYSTEM

PRIORITY

The present application claims priority to U.S. Provisional Application Ser. No. 62/667,174, filed May 4, 2018, which is incorporated by reference in its entirety.

BACKGROUND

A distributed storage system can support several different types of applications, from social networking to managing medical records. The distributed storage system can be implemented with user files, structured storage, and message delivery in order to support storage and workflow of the applications. Specifically, a distributed storage system can be configured to receive requests to perform transactions that facilitate the storage and workflow of the applications.

To provide failover capability, a distributed storage system may replicate data. For example, a cloud provider implementing the distributed storage system may allow tenants to replicate databases. A database may be replicated in the same data center or in a different datacenter which may be in a different geographical region. The replicated database may be available for querying or failover. For example, if the primary database fails, or simply needs to be taken offline, failover can be initiated to the secondary database so the customer can continue to access their data.

To replicate data, the secondary database is created. Once created, the secondary database is populated with the data copied from the primary database, which is commonly referred to as seeding. After the secondary database has been created and seeded, updates to the primary database may be replicated to the secondary database. The replication of the updates can cause performance issues. For example, the replication of the updates may include committing transactions to the primary database before they are replicated to the secondary database. Accordingly, there can be a delay in updating the secondary database and providing the tenant with access to their data via the second database.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

Figure 1:
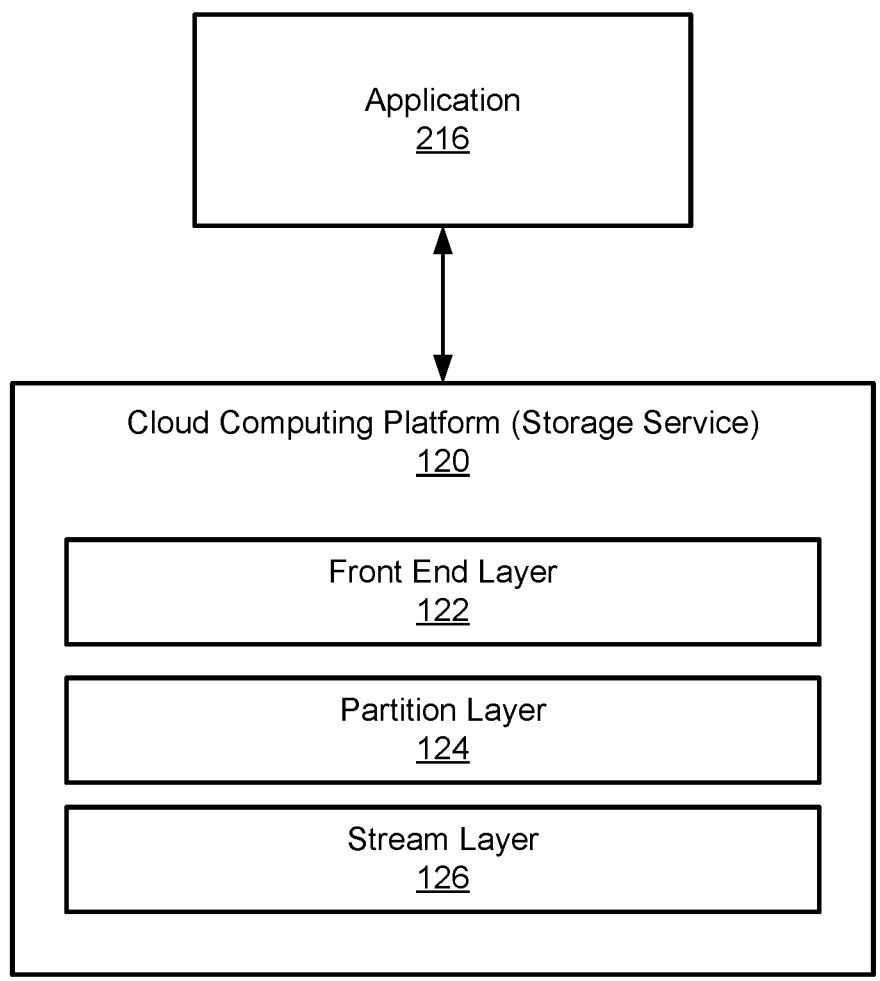
FIG. 1 shows an architecture of a distributed storage system, according to an embodiment.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

According to an embodiment of the present disclosure, a distributed storage system may store data in a plurality of nodes. The system may include a primary data structure that stores data, such as pointers to data objects stored in the system, and metadata for the data together. The system may also include a secondary data structure, referred to as a blocks table, that stores data and meta data for certain data objects that may be striped across partitions in the system. Certain criteria may be used to determine whether to stripe certain data objects across partitions in the system. In an example, a size threshold of a data object may be used to select data objects for striping. In an example, large data objects, having a size greater than a threshold (e.g., a 1 megabyte (MB) threshold, or a 4 MB threshold, etc.), are striped across multiple partitions to improve throughput for accessing those data objects, and the blocks table is used to store information for those data objects. In other examples, multiple heuristics or criteria are used to select data objects for striping. For example, size, location, type of data storage (e.g., flash versus disk), etc., may be used to determine whether to stripe a data object and store it in the blocks table. In certain situations, the objects table can grow to terabytes and can become a bottleneck for accessing data objects in the system. By storing certain data objects in the blocks table, the bottleneck may be minimized and throughput for accessing those objects is greatly increased.

According to an embodiment of the present disclosure, data replication in the distributed storage system is implemented through a hybrid combination of log shipping and data pulling. For example, small data objects are replicated using log shipping, however, larger data objects are replicated by pulling the data objects from a primary location to a secondary location. For example, a large block of data, which may have a size greater than a predetermined threshold, may be striped across multiple partitions as is discussed above. To stripe the block of data, the block of data may be divided into smaller subblocks, which may have a predetermined size. These smaller subblocks are immutable. As a result, the subblocks may be pulled from the primary location to the secondary replication for data replication, because ordering of transactions maintained by log shipping may not be needed. This provides a variety of time savings for replication. For example, the subblocks may be pulled from a plurality of partition servers in parallel, reducing the amount of time to collect the data at the secondary location. Also, the data pulling reduces input/output (IO) transactions, as the log shipping systems persist logs on the secondary location before replaying them.

For purposes of a detailed discussion below, embodiments and examples of the distributed storage system are described with reference to a storage service supported by a cloud computing platform, and further by way of example, a cloud computing platform having a front end layer, partition layer, and stream layer. However, the embodiments and examples described herein can be performed in different types of operating environments having alternate configurations of the functional components described herein. As such, the embodiments and examples may be extended to other implementation contexts.

The distributed storage system can be implemented as a cloud computing platform that runs cloud services across different data centers and geographic regions. The cloud computing platform can implement a fabric controller component for provisioning and managing resource allocation, deployment/upgrade, and management of cloud services. Typically, a cloud computing system acts to store data or run service applications in a distributed manner. The service-application components (e.g., tenant infrastructure or tenancy) of the cloud computing system may include nodes (e.g., computing devices, processing units, or blades in a server rack) that are allocated to run one or more portions of a tenant's service applications.

Nodes of the distributed storage system may include virtual machines or physical machines. The nodes can concurrently run separate service applications, respectively, in individualized computing environments that support the resources and/or operating system specific to each service application. Further, each service application may be divided into functional portions such that each functional portion is able to run on a separate virtual machine. In cloud computing systems, multiple servers may be used to run service applications and perform data storage operations in a cluster. In particular, the servers may perform data operations independently but exposed as a single device referred to as a cluster. Each server in the cluster may be referred to as a node.

A storage service on the cloud computing platform can be a service supported using the fabric controller component. The storage service can be responsible for managing the replication and data placement across disks and load balancing the data and the application traffic with storage clusters. The storage service can be responsible for managing access to a high volume of storage. The storage service can implement a storage stamp as a cluster of N racks of storage nodes and a location service that manages the storage stamps. Specifically, the location service can allocate location stamps and manage them across the storage stamps for disaster recovery and load balancing.

FIG. 1 shows an architecture for a distributed storage system 100 on a cloud computing platform 120, according to an embodiment of the present disclosure. The system 100 includes a storage service including a front-end (FE) layer 122, a partition layer 124, and a stream layer 126 (or distributed file system layer). The FE layer 122 may be configured for receiving incoming requests from an application 216 or client. Upon receiving a request, the FE layer 122 can authenticate and authorize the request. The FE layer 122 can route the request to a partition server in the partition layer. A partition server is also referred to as a table server or TS. A partition map is maintained that keeps track of partitions and which partition server is serving which partition. The FE layer 122 may access the partition map to determine the partition server serving a partition to be accessed.

The partition layer 124 is responsible for managing and understanding high level abstractions of user files, structured storages, and messaging. The partition layer 124 also provides a scalable index, transaction ordering, and storing consistency for objects. The partition layer 124 can specifically support storing object data on top of the stream layer 126. In an example, the partition layer partitions data objects within a storage stamp.

The partition layer 124 includes the primary data structure, referred to as the objects table (OT). The OT indexes blocks stored in the distributed storage system. The OT can grow to be a massive table, such as several petabytes. The OT is dynamically broken up into range partitions, referred to herein as partitions, and spread across partition servers of a storage stamp. A partition may include a contiguous range of rows in the OT from a given low-key to a high-key. For example, the storage space in the storage stamp is represented as a key space divided amongst a plurality of partitions. In an example, each row in the OT has a primary key determined from properties of the data object in the row, and the keys may be used for indexing and sorting the rows in the OT and for performing look-ups. Each key may be defined by one or more properties of the data objects stored in the system 100. For example, the primary key may include one or more properties of a data object, such as Account Name, Partition Name and Object Name. In an example, properties of data objects may be selected to generate keys for each row in the OT table. For example, properties may be selected to generate a partition key and a row key for each row. An account name, a table name and partition key together may identify the partition within the storage service where the data object is stored. The row key may uniquely identify each row in a partition in the OT. As with keys in a relational database table, partition key and row key values are indexed to create a clustered index that enables fast look-ups. The OT may be distributed across partition servers serving requests for the partitions.

Also, the partition layer 124 includes the blocks table. The blocks table may also be partitioned and distributed across partition servers. The blocks table indexes blocks stored in the partition servers. The blocks table may include one or more keys defined by one or more properties of the data objects stored in the blocks table. When a binary large object (blob) or another type of data object is striped across partitions, a blocklink (e.g., a pointer) may be created for each subblock, and stored in the blocks table along with other metadata. The blocklink is also stored in the OT for the blob, and may be used to retrieve the subblock for the blob. The blocks table and the OT are further discussed below.

In an embodiment, the blob data is stored in the same logs and checkpoints as typical row data, but in different structures. In an additional exemplary embodiment, the blob data is stored in separate logs and checkpoints from the row data. This allows for compaction/merging of the row checkpoints without having to recopy blob data, and it allows for a single-write blob insert/update. As previously mentioned, the blob data is typically large, therefore, abstaining from the recopying of blob data provides efficiencies. By storing the blob data in different logs and checkpoints, the expense of recopying the data can be minimized because blob data can be large (relative to traditional row data). Additionally, the separate logs and checkpoints can be stored in the same file or stream, or in the alternative, the blob data can be stored in a separate stream from the row data.

The stream layer 126 stores bits on disk or other types of storage devices and supports replicating the data across many servers to keep data durable within a storage stamp. The stream layer 126 supports files called streams which are ordered lists of large storage chunks called extents. The stream layer stores and replicates extents. The data stored in the stream layer is accessible from the partition layer 124. The stream layer 126 may provide a file system namespace and an Application Programming Interface (API) for the partition layer 124 to perform writes and reads. Writes can be append-only. The interface between the stream layer 126 and partition layer 124 allows a client to open, close, delete, rename, append to, and concatenate streams. A stream can refer to an ordered list of extent points and an extent is a sequence of append blocks. An extent can be a seal extent, such that, the extent can no longer be appended to. An application can read data from extents to access block contents of the extents.

The stream layer 126 can include a stream manager and an extent node. The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents it owns and where the peer replicas are for a given extent.

The distributed storage system 100 can support several different types of applications, from social networking to managing medical records. The distributed storage system 100 can specifically be implemented with user files, structured storage, and message delivery in order to support storage and workflow of the applications. The distributed storage system 100 can be configured to receive transactions that facilitate the storage and workflow of the applications.

Figure 2:
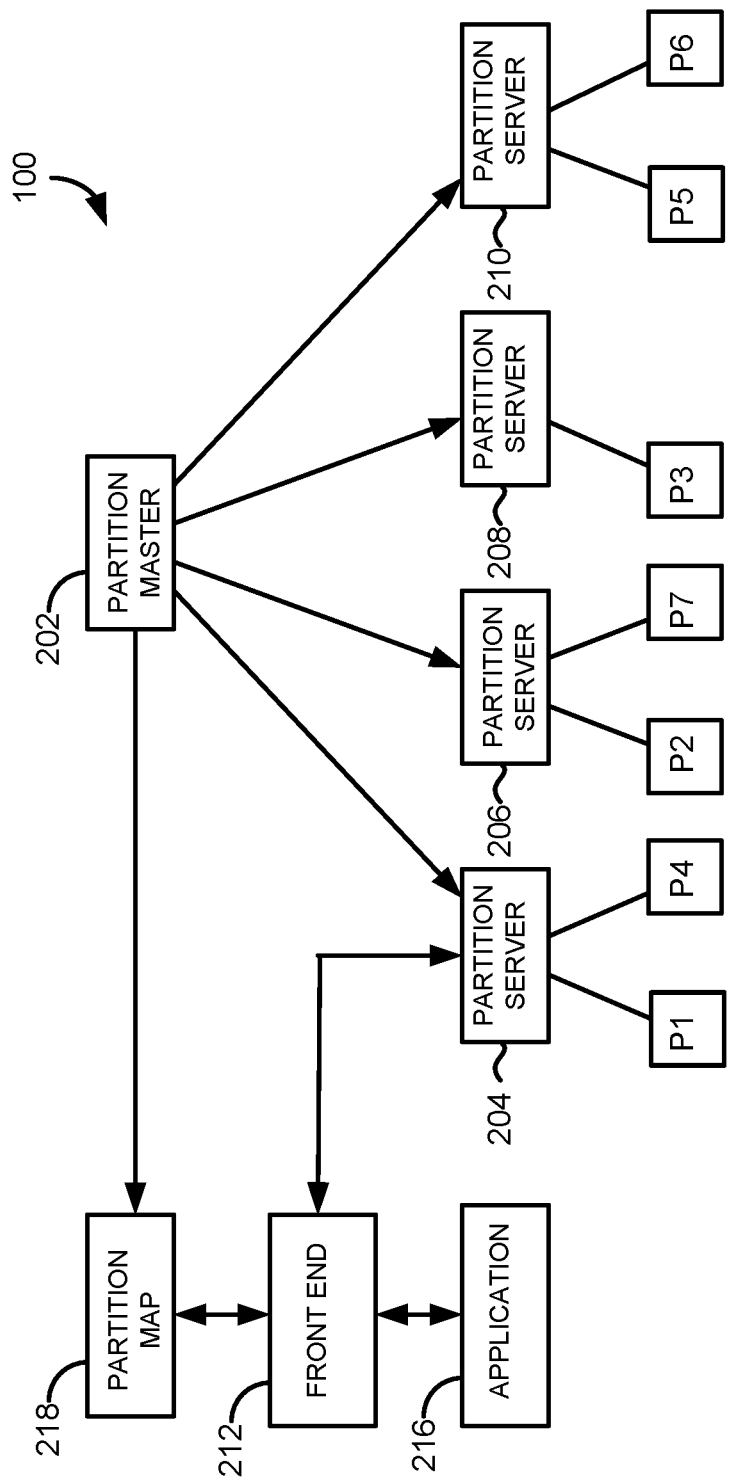
FIG. 2 shows components of a front end layer and a partition layer of the distributed storage system, according to an embodiment.

FIG. 2 illustrates an example of components of the distributed storage system 100, including components of the FE layer 122 and the partition layer 124. Many of the components described herein are functional entities that may be implemented as discrete or distributed components or in conjunction with other components, and in any suitable combination and location. Various functions described herein as being performed by one or more entities may be carried out by hardware, firmware, and/or software. For instance, functions and operations performed by the layers and components described herein may be carried out by a processor executing instructions stored in memory.

The components of the partition layer 124 may include master 202 (e.g. partition master 202), servers 204, 206, 208, and 210 (e.g. partition servers 204, 206, 208, and 210), and FE 212 (e.g. partition FE 212). Each may reside on any type of computing device. The components may communicate with each other over a network, which may include, without limitation, one or more local area networks (LANs) and/or wide area networks (WANs). Although a single master, four servers, and a single FE are shown in FIG. 2, any number of masters, servers, and FEs may be employed within the distributed storage system 100 within the scope of implementations of the present disclosure.

Stored data of the distributed storage system 100 is divided amongst a plurality of partitions. For example, a key space representing stored data objects is divided amongst the plurality of partitions. The partitions may include range partitions in the OT, as is mentioned above and as is further discussed below. Master 202 is configured to assign the partitions to partition servers 204, 206, 208, and 210, and/or other servers of a cloud computing system. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of the distributed storage system 100 not shown. Additionally, master 202 is configured to monitor resource utilization with respect to any of the partitions and/or servers 204, 206, 208, and 210, and/or other servers of the distributed storage system 100 not shown. It is further contemplated that master 202 is configured to support integrated resource allocation and load balancing in accordance with embodiments of the present invention, as discussed in more detail below.

The servers, such as partition servers 204, 206, 208, and 210, are utilized to store and provide access to the data objects of the distributed storage system 100. Master 202 is configured to manage the servers. Furthermore, front end (FE) 212 is configured to provide applications, such as application 216, access to the distributed storage system 100. Each server, such as partition servers 204, 206, 208, and 210, can be responsible for providing read and write access from zero to many partitions assigned to the server. In the example shown in FIG. 2, server 204 is hosting partitions P1 and P4, server 206 is hosting partitions P2 and P7, server 208 is hosting partition P3, and server 210 is hosting partitions P5 and P6.

FE 212, which may be part of the front-end layer 122 shown in FIG. 1, is linked into an application, such as application 216. FE 212 may be configured to issue commands to some of the partitions (e.g. partitions P1, P2, P3, P4, P5, P6, and P7) hosted by partition servers 204, 206, 208, and 210 and/or other servers. Also, in some implementations, FE 212 may communicate with the application indirectly, for example, through a virtual IP and software load balancer or other means that directs communication requests. The FE 212 can utilize a partition map, such as partition map 218, to determine which of the servers is hosting (mapped to) which of the partitions and can send commands to those servers. Results of the commands can be received back from the servers and can be passed to the application 216. The partition map 218 stores mappings between the partitions and the servers they are assigned to, and can typically be maintained by a master, such as partition master 202.

Data objects stored in the distributed storage system 100 may include binary large objects referred to as blobs. The distributed storage system 100 is functional to provide scalable, available, and durable blob storage in a structured storage environment. A blob is a collection of binary data stored as a single entity. As a matter of example, blobs may be images, audio, records, text, or other multimedia objects. Blobs can also be executable code or other collections of binary data.

In an example, the OT is in the partition layer 124 shown in FIG. 1, and can store data and metadata for blobs. For example, the OT includes row data for each of the blobs. The row data includes metadata corresponding to each blob, and the row data includes a pointer to a storage location for the blob. In an example, a schema for the OT may include account name, container name, blob name, and other meta data describing blobs. The schema may also include one or more pointers to the blob that describe the location of the blob in the stream layer, such as a stream position. The OT may also include a blocklink for its subblocks if they are striped across partitions.

In an example, the blocks table is in the partition layer 124, and can store data and metadata for subblocks of a blob that are striped across a plurality of partitions. For example, the blocks table includes row data for each subblock. The row data includes metadata corresponding to each subblock, and the row data includes a pointer to a storage location for the subblock. In an example, a schema for the blocks table may include a blocklink, account name, container name, blob name, block ID and other meta data describing the subblock. The schema may also include a pointer to the subblock. In an example, the blocklink includes a globally unique ID (GUID) for the subblock, and the blocklink is also stored in the OT for the corresponding blob and is used as a table key linking the row for the subblock in the blocks table to the row for the blob in the OT.

Figure 3:
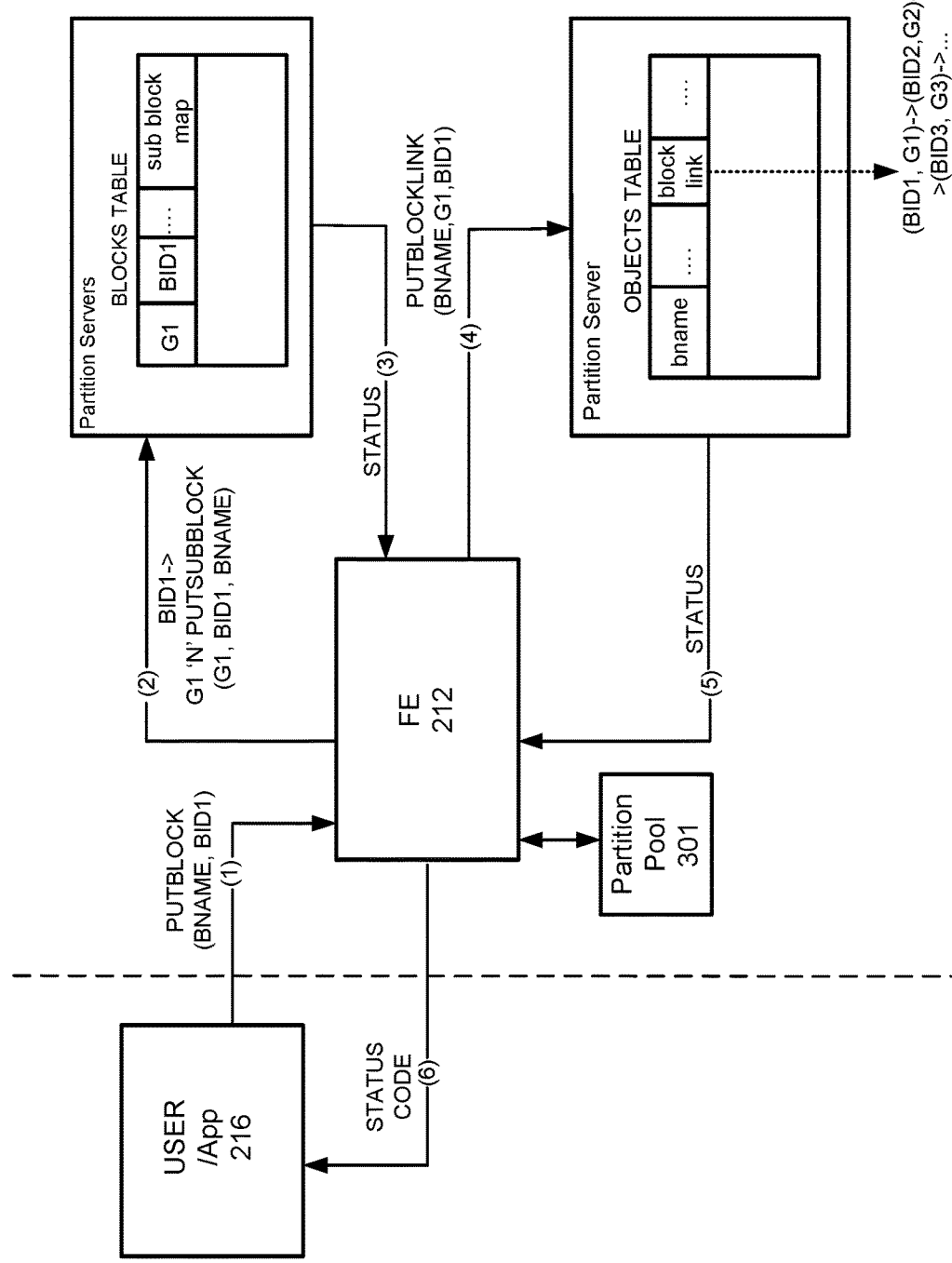
FIG. 3 shows a data flow diagram for a write request, according to an embodiment.

According to an example of the present disclosure, a block may be striped across multiple partitions instead of being stored on a single partition. FIG. 3 shows an example of a data flow for a write request that may be striped across multiple partition servers. In this example, the write request is a put block request. Although the data flow is shown for a write request, the system 100 is operable to perform read (e.g., get request) and write requests for a block which may or may not be striped across multiple partition servers.

Referring to FIG. 3, at (1), a FE of the distributed storage system 100, such as FE 212 shown in FIG. 2, receives a put block request from a user. The put block request may alternatively come from an application, such as application 216 shown in FIGS. 1 and 2. The put block request may include a blob name, shown as BNAME, assuming the block is part of a blob, and a block identifier (ID), shown as BID1, of the block to be put in the distributed storage system 100. A block is a data object. In an example, the block is for a collection of data objects that may be stored or managed as a single entity. The block may be one of a plurality of blocks of a blob.

The FE 212 determines whether to stripe the incoming put block request across multiple partitions instead of storing in a single partition. For example, a pool of dedicated partitions for striping, shown as partition pool 301, may be maintained. In an example, the partition pool 301 may not be directly connected to the FE 212. For example, the partition pool 301 is maintained by the partition layer 124 shown in FIG. 1, and the FE 212, which may be part of the front-end layer 122, communicates with the partition layer 124 to store or retrieve data to or from a partition from the partition pool 301.

Referring back to FIG. 3, the FE 212 determines whether the block for the put block request meets predetermined criteria for striping. For example, assume that the FE 212 determines the block size of the block in the put block request meets predetermined criteria, such as being greater than a predetermined size, and then in response to the determination, the FE 212 decides to stripe the block across a plurality of partitions from the partition pool 301. The FE 212 divides the block into subblocks. A default size may be used for the subblocks. The subblocks determined by the FE 212 are immutable. The FE 212 generates a blocklink for each of the subblocks. The blocklink includes a GUID for each of the subblocks. The GUID for each subblock uniquely identifies the subblock across the partitions that may store the subblocks for the striped block. For example, each GUID uniquely identifies a subblock in the partition pool 301. The GUID may include a prefix that is random and is used to select a partition from the partition pool 301 to store each subblock. For example, a goal of the FE 212 may be to evenly distribute the load of the partition pool 301.

Each of the partitions in the partition pool 301 may be pre-assigned a prefix value in a range. To store each subblock, a prefix value in the range may be randomly generated to select a partition from the partition pool 301 to store the subblock to evenly distribute the load among the partitions in the partition pool 301.

At (2), the FE 212 sends putblock requests for the subblocks to the partition servers serving the applicable partitions from the partition pool 301 after determining to stripe the block. For example, the FE 212 sends a sequence of put subblock requests to the partition servers serving requests for partitions that are selected from the partition pool 301 according to the GUID prefixes selected for the subblocks. The request for each subblock may identify the GUID generated for the subblock, the block ID, the block name, and may specify other information. For each subblock request, a row in the blocks table may store the information for the request. For example, a portion of the first row of the blocks table is shown, and may include G1, which is the GUID for the first subblock, BID1, which is the block ID for the block containing the subblock, and a subblock map which specifies the partition server to host the subblock. A row may be created in the blocks table for each subblock. At (3), the FE 212 receives a status of each of the put subblock requests from the corresponding partition servers, which indicates the information has been written to the corresponding partition servers associated with the partitions from the partition pool 301 that were selected to store the subblocks.

At (4), the FE 212 sends a PutBlockLink request to the applicable partition server after getting confirmation the subblocks have been written. For example, the PutBlock-Link request is sent to the partition server serving the partition associated with the blob, which was initially identified by its blob name in the putblock request at (1). For example, the FE 212 sends a PutBlockLink command to the applicable partition server storing the OT associated with the block ID. The PutBlockLink command may include the block name, blocklink, blockID and other applicable inputs, and this information is stored in a row of the objects table of the partition server. Accordingly, the blocklink, e.g., G1, stored in the OT is a key to the blocks table to identify the location of the subblocks.

At (5), the FE 212 receives from the partition server serving the OT, an indication that the row has been written for the subblock to the OT. A row may be written to the OT in the partition server for each blocklink. At (6), a status is sent to the user/application 216 that the put block request is completed.

Figure 4:
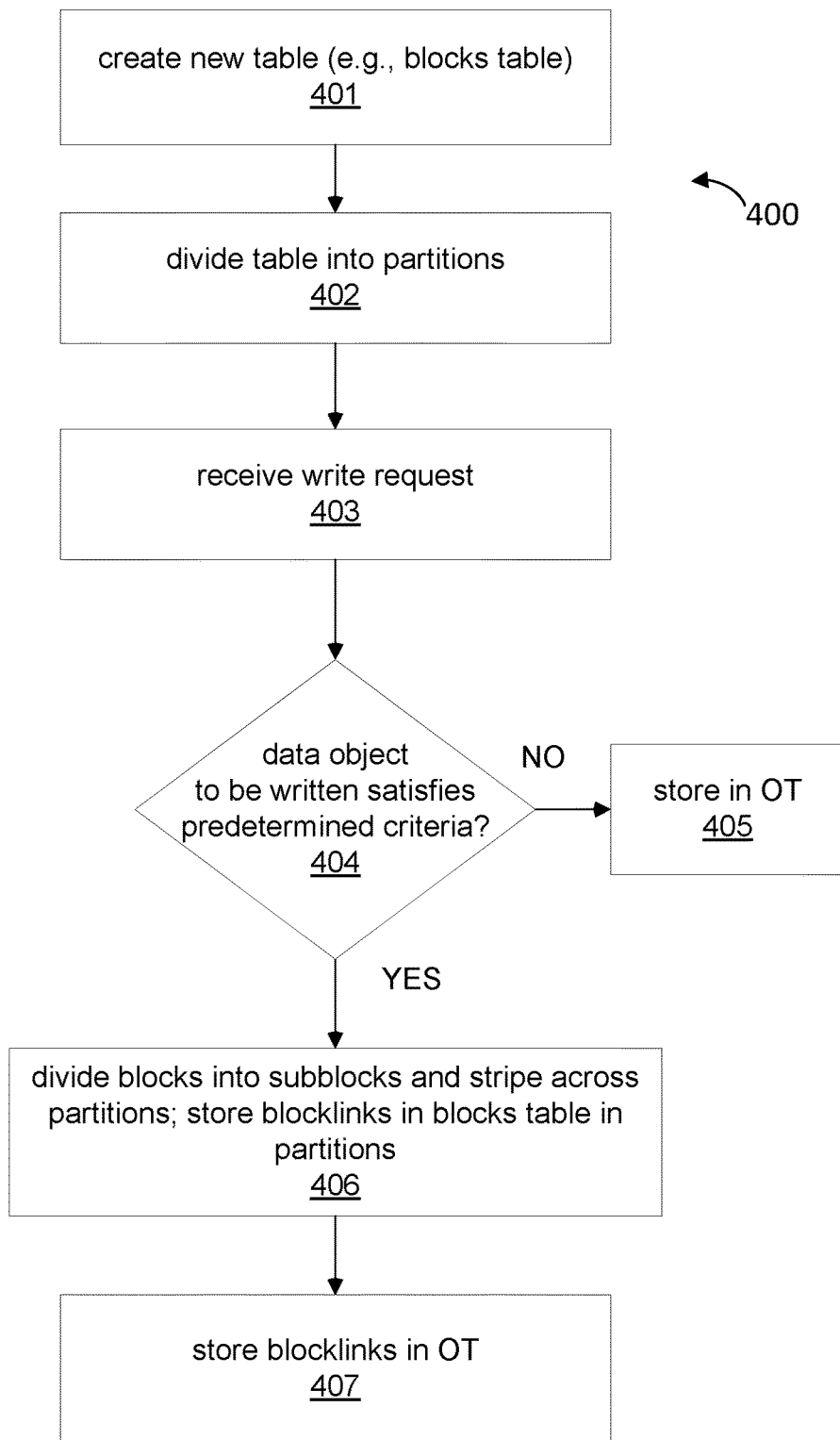
FIG. 4 shows a flow chart that may be performed by the distributed storage system, according to an embodiment.

FIG. 4 illustrates a flow chart 400, according to an embodiment. At 401, a new table is created, such as the blocks table, to serve as an index hosting different subblocks of a blob (or other data object) across multiple partitions. The OT may already exist. The blocks table can host subblocks of blobs from multiple accounts of a tenant of the cloud distributed storage system. At 402, the blocks table is divided into "X" partitions. In examples, "X" is percentage of a total partition count. Each partition is associated with a prefix of a GUID. A pool of the partitions may be created and the partitions are served by a plurality of partition servers.

At 403, a write request is received, e.g., put block request. The write request may be for a blob. At 404, a determination is made as to whether a data object to be written satisfies predetermined criteria. For example, a determination is made as to whether the block to be written has a size greater than a predetermined threshold. Other criteria may be used for the determination and may be dynamic. If no (e.g., size is less than or equal to threshold), then the block is not striped, and the block's metadata is stored in the OT at 405. For example, the block and its metadata are written to a partition serving the OT. At 406, if yes (e.g., size is greater than the threshold), the block is divided into subblocks, and the subblocks are striped across partitions and written to the blocks tables associated with the partitions. The subblocks, their blocklinks including GUIDs, and other metadata are stored in the blocks tables of the partitions. At 407, the blocklinks are stored in the OT associated with the original block, such as a blob, which is divided into the subblocks. Then, if a read request for the block is received, the FE 212 may retrieve the subblocks from the blocks tables based on the blocklinks in the OT. In an example, to retrieve a striped block, a block identifier of the block is determined. Then, an entry in the OT associated with the block identifier of the block is identified. The pointer, including GUIDs, which identifies entries in the blocks table for the subblocks of the block is determined from the entry. A lookup is executed in the blocks table according to the pointer to identify the partitions storing the subblocks for retrieving the subblocks.

The block tables may be transparent to the user or application 216 making the request that is received at 403. By dividing the block into subblocks and storing them in different partition servers, the subblocks may be written or read in parallel, and may improve throughput of the requests. Also, bottlenecks caused by only using the OT to read and write blocks, such as blobs, are avoided.

Figure 5:
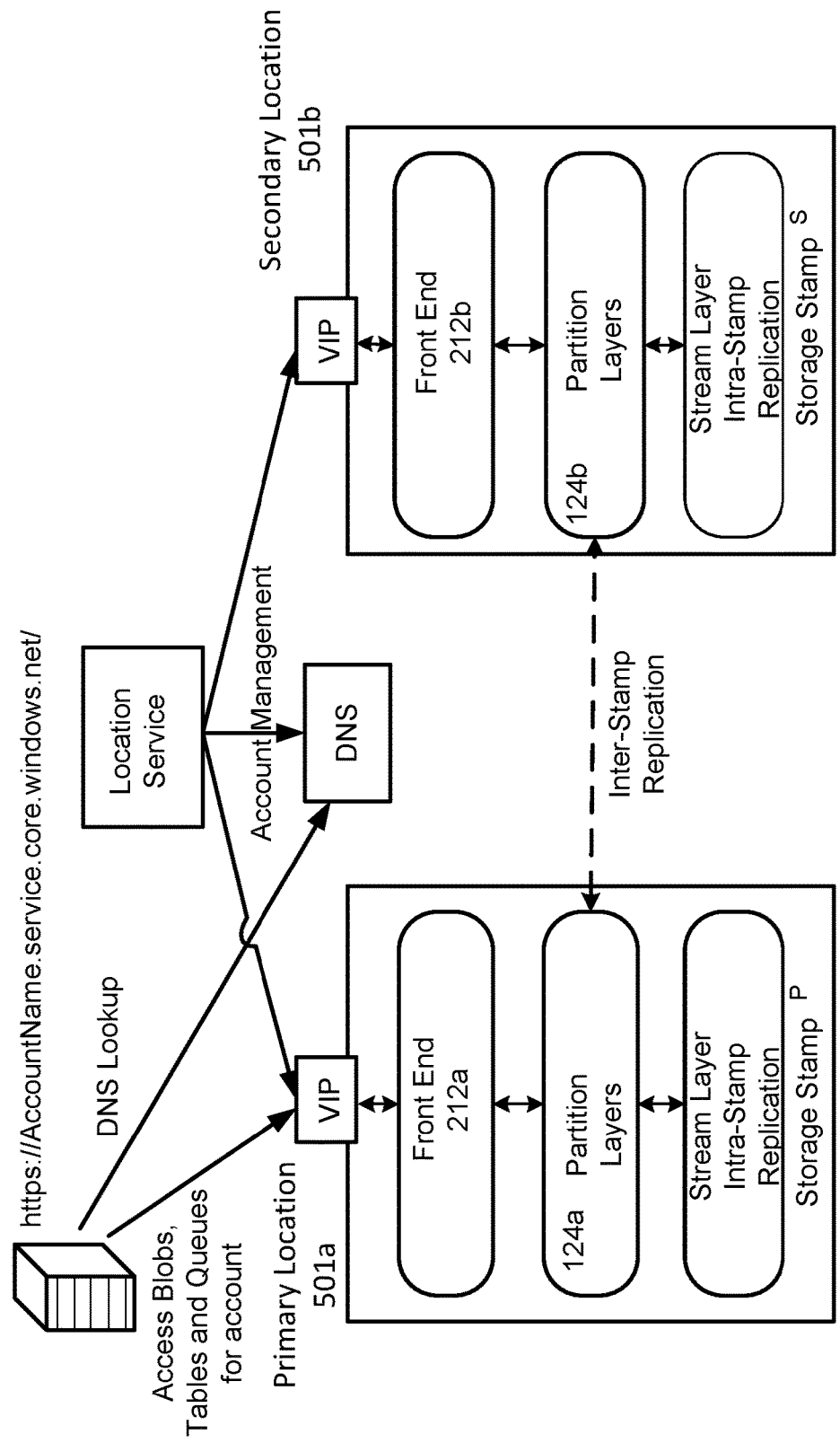
FIG. 5 shows geo replication between storage stamps, according to an embodiment.

The distributed storage system 100 may replicate a tenant's data to make available a redundant copy of the data to the tenant for disaster recovery or for other purposes. FIG. 5 shows a high-level block diagram of replication that may be performed in the distributed storage system 100. The data replication may be from a primary location 501*a* to a secondary location 501*b*. The locations 501*a-b* may be different geographic locations. In an example, the locations may be data centers provided in different geographic locations. The different geographic locations may be different regions, so that if a catastrophe, such as a natural disaster, happens in one data center, it should not affect the other data center.

In an example, the data replication may be performed between partition layer 124*a* in a storage stamp in the primary location 501*a* and partition layer 124*b* in a storage stamp in the secondary location 501*b*. Other layers, such as a front-end layers (e.g., including front end 212*a* and 212*b*) and stream layers, in the storage stamps may also be involved in the replication. A location service of the distributed storage system 100 may keep track of the primary and secondary locations 501*a-b* for a tenant's account, and the storage stamps in the locations that are assigned to the account. For example, when provisioning the account, the location service chooses a stamp in each location and registers the AccountName with both stamps such that the US South stamp P (e.g., primary, P) takes live traffic and the US North stamp S (e.g., secondary, S) takes inter-stamp replication (also called geo-replication) traffic from stamp P for the account.

When a write comes into stamp P for the account, the change is replicated within that stamp using intra-stamp replication at the stream layer then success is returned to the client. After the update has been committed in stamp P, the partition layer 124*a* in stamp P asynchronously geo-replicates the change to the secondary stamp S using inter-stamp replication. When the change arrives at stamp S, the transaction is applied in the partition layer 124*b* and this update fully replicates using intra-stamp replication within stamp S. Since the inter-stamp replication is done asynchronously, recent updates that have not been inter-stamp replicated can be lost in the event of disaster.

Inter-stamp replication is used for both account geo-replication and migration across stamps. For disaster recovery, an abrupt failover may need to be immediately performed, and recent changes may be lost. For migration a clean failover may be performed so there is no data loss. In both failover scenarios, the location service makes the secondary stamp S for the account the new primary and switches the primary location for the account to the secondary stamp S.

According to an embodiment, inter-stamp replication, such as replication between storage stamps P and S in primary and secondary locations 501*a-b*, is performed using log shipping and data pulling. Log shipping may be used for replicating small data objects, such as data objects having a size less than or equal to a predetermined threshold. The threshold may be the same that is used for purposes of determining whether to stripe a data block, such as described above. In an example, log shipping may be used for data that is not striped. The striping is described above with respect to FIGS. 3-4. For larger data objects, such as a blob that is striped and has its subblocks written to the blocks table, the subblocks may be replicated using a data pulling process as is further discussed below.

Figure 6A:
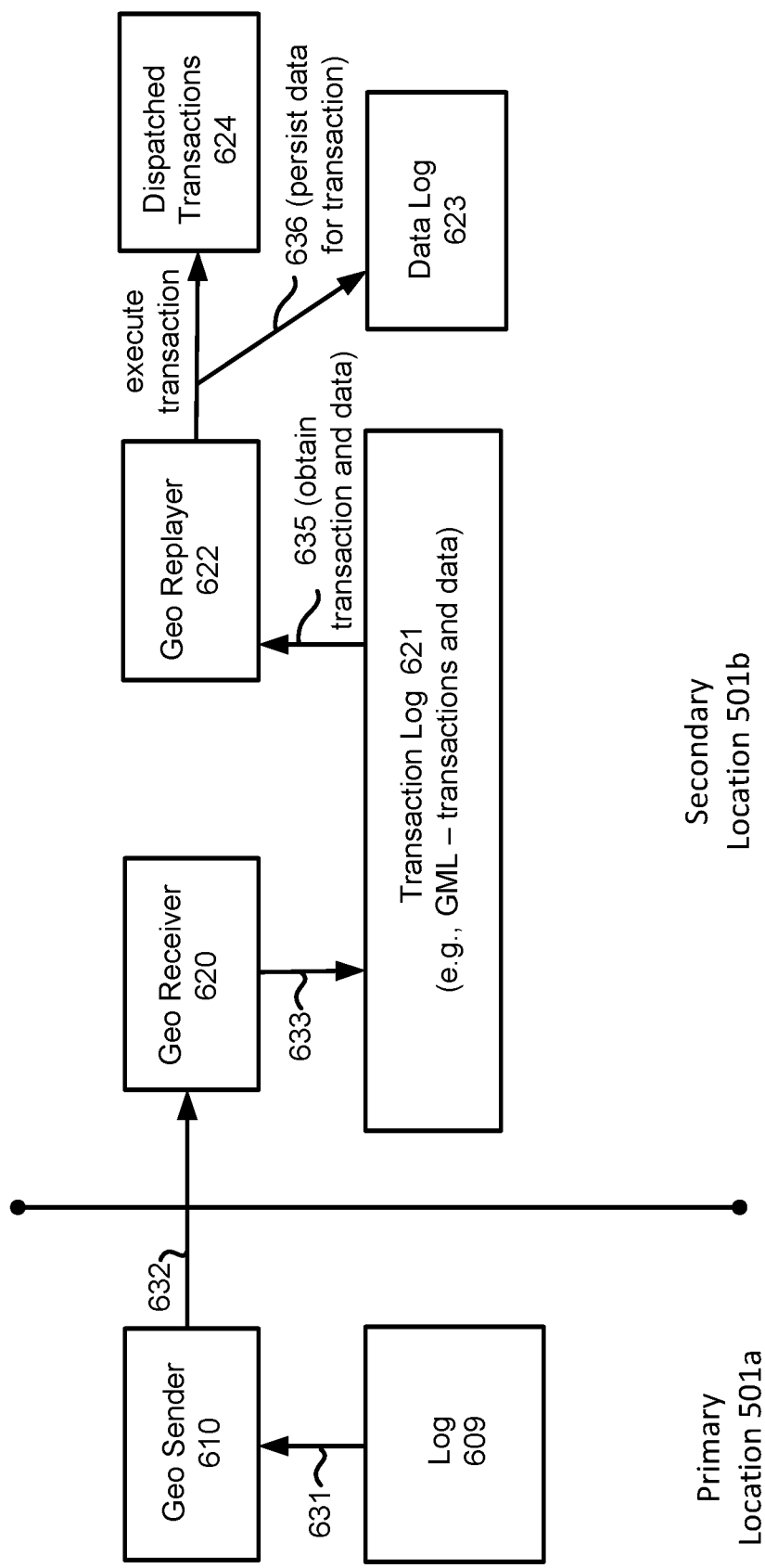
FIG. 6A shows a high level flow diagram for geo replication, according to an embodiment.
Figure 6B:
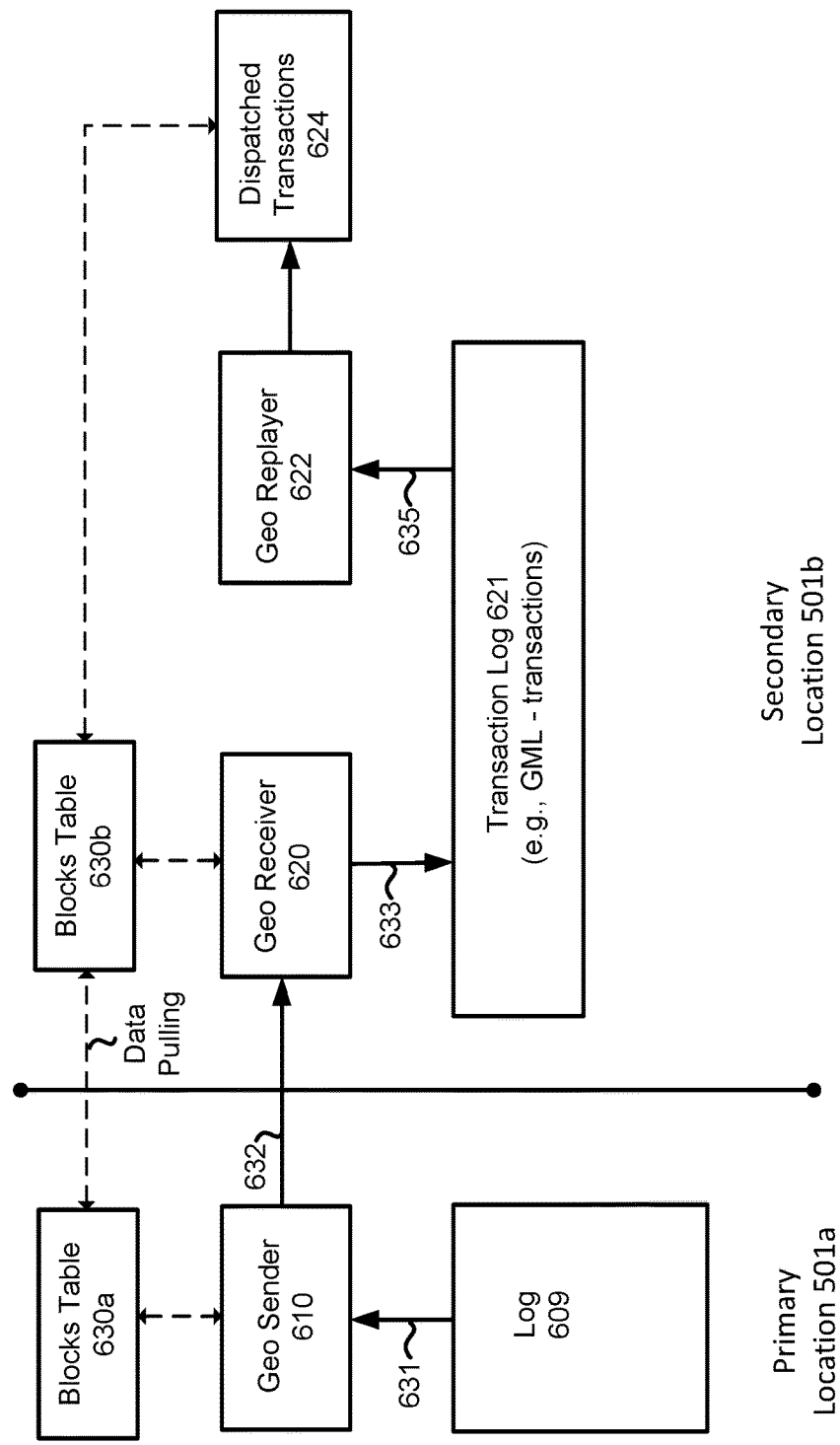
FIG. 6B shows a high level flow diagram for a data pulling process, according to an embodiment.

FIGS. 6A-6B show flow diagrams for geo replication, which may include asynchronous inter-stamp replication for stamps located in different geographic regions. In particular, FIG. 6A shows steps for log shipping, and FIG. 6B shows steps for the data pulling process. One or more of the components performing the geo replication may include machine readable instructions stored on a storage medium and executed by a processor to perform the operations of the component. Components, such as logs, tables, log streams, etc., may be stored on a storage medium.

Referring to FIG. 6A, at the primary location 501*a*, a client (e.g., a user or application) may communicate data to a stamp at the primary location 501*a*. The stamp may be associated with an account of the client. The stamp may be comprised of a plurality of partitions, such as multiple partition servers. A partition server may store memory tables and logs. For example, a partition may be comprised of an update log, a block log, a page log, and/or a geo message log. In an example, a log is located within a stream layer of a distributed computing environment such that the log is a discrete data stream that is append only.

A log stream may be relied upon to re-establish data of a storage stamp following a failure of a portion of a storage stamp (e.g., a storage node). For example, data may be committed to a storage stamp at a particular partition, but following the failure of the partition, the state of the partition is recreated, at least in part, by replaying one or more logs associated with that partition. Data may not be "committed" to a particular storage stamp until it is replayed into (e.g., written into) one or more logs of the storage stamp. A distinction exists between data that is merely stored or written to a stamp and data that is committed to the stamp. For example, data may be written to a log of a storage stamp, but that data is not accessible to a client until the data is committed to the storage stamp. Committal of the data from a log, in an exemplary embodiment, may occur by the playing (or replaying) of the data from the log in order, which may not be strictly sequential, but instead merely in order. Data may be received in a non-sequential manner at the secondary location 501*b*. However, it may be desired to commit the data in a sequential manner. The non-sequentially received data may be stored in a log, such as data log 623, until a portion of the data can be committed to the storage stamp in a sequential manner.

Referring to FIG. 6A, a client (e.g., a user or application) may communicate data to a stamp at the primary location 501a, and the data may be committed to a partition at the stamp, and data for the transaction is written to log 609. Also, a transaction that was executed to store the data in the stamp is written to log 609 or another log.

After the data is committed at the primary location 501a, geosender 610 obtains replication information from the log 609, at 631, and transmits the replication information, at 632, to a georeceiver 620 at the secondary location 501b. The replication information may include the transaction executed at the primary location 501a and may include the data committed at the primary location 501a, such as for the log shipping process as is discussed in more detail below. For example, the geosender 610 communicates a geo message to georeceiver 620 including the replication information. The replication information in the geo message may include a collection of transactions which have been batched to form a geo message for a particular geo location, stamp, and/or partition. A geo message may include a message ID that uniquely identifies that geo message (e.g., epoch # and sequence #). Further yet, a geo message may be annotated to include a commit ID from the primary storage system. There can be many log entries making up a transaction, with a final commit log entry for the transaction. Information may indicate what the original transaction was, e.g., Put Block, Put Block List, etc., which is used to determine how to correctly replay the transaction at the destination, and include additional information to re-execute the transaction at the destination (e.g., Last Modified Time, for Put Block List the final block list indicating if the blocks came from the committed or uncommitted list, etc.).

The replication information is written to the transaction log 621 from the georeceiver 620 at 633. In an example, a geo message is written almost immediately, upon receipt by the georeceiver 620 at a secondary data stamp at the secondary location 501b, in a transaction log 621. This near immediate writing of the geo message may allow for the secondary data store at the secondary location 501b to provide an acknowledgement back to the supplying primary data store at the primary location 501a that the data has been written durably (but may not have yet been committed) at the secondary data store. In this example, the primary location 501a does not have to wait for acknowledgement of the re-execution of some of the geo-transactions (e.g. portions of the geo message) at the secondary location 501b. Consequently, the geo message is written to the transaction log 621, and then replayed at a later time.

The transaction log 621, also referred to as a geomessage log (GML), at the secondary location 501b stores the replication information, including transactions, logs, data, etc. For example, for log shipping, the georeceiver 620 writes block data for each of the transactions and the transactions to the transaction log 621. This is illustrated by the below example of putblock transactions received from the client, which are executed on a primary stamp at the primary location 501a. The transactions are transmitted in a geo message to the secondary location 501b by the geosender 610, and received at the georeceiver 620, whereby the georeceiver 620 then writes the following to the transaction log 621:

PutSubBlock(Gx,0, . . . )→Write to .GML
PutSubBlock(Gx,1, . . . )→Write to .GML
PutSubBlock(Gx,2, . . . )→Write to .GML
PutSubBlockList(Gx, . . . )→Write PutSubBlockList to .GML.

For log shipping, the transaction and the block data are written to the transaction log 621 at 633, and the block data is subsequently written to data log 623. For example, the geo replayer 622 retrieves the block data from the transaction log 621 and stores the block data in the data log 623, such as when the transaction is dispatched as is further discussed below. In an example, transactions are received and the order of execution of the transactions is maintained in the transaction log 621. Then, the transactions are replayed according to their order. Then, the geo replayer 622 can execute the transaction from the transaction log 621 along with persisting the block data in the data log 623 (i.e., committing the data to the data log 623) according to the stored order of execution. For example, at 635 the geo replayer 622 obtains a transaction and the associated block data from the transaction log 621, and persists the data for the transaction in the data log 623 at 636 when the transaction is executed. The georeplayer 622 executes the transaction or multiple transactions, whereby the executed transactions are shown as dispatched transactions 624, and the dispatched transactions 624 should bring data objects stored at the secondary location 501b to a same state of the data objects stored at the primary location 501a. For example, when a transaction is replayed from the transaction log 621, it is replayed into a corresponding Update/Block/Page logs, and the data is committed at a secondary stamp at the secondary location 501b.

As was discussed above, log shipping is a replication technique for maintaining a copy of data. A transaction log may include a file that contains a record of the changes that were made to data at the primary location. All changes are recorded in the transaction log files before the changes are written to the database at the primary location. If a database shuts down unexpectedly, unfinished transactions can be restored by replaying the transaction log files into the database. Log shipping writes the log first to the transaction log 621 and then replays the transactions in the logs. For example, logs are received and the order of the transactions in the logs are maintained in the transaction log 621. Then, the transactions are replayed according to their order.

In contrast to log shipping, for the data pulling process, the steps of writing the block data to the transaction log 621 and then writing data to the data log 623 are bypassed, because the block data is pulled from the stamp at the primary location 501a and is written to a blocks table, such as blocks table 630b, at the secondary location 501b without first writing the data to the transaction log 621. This is illustrated in FIG. 6B. For example, as represented by the dashed line, for the block links persisted/stored in the log 609 and blocks table 630a at the primary location 501a, the data is pulled from the blocks table 630a and stored in the blocks table 630b at the secondary location 501b. Thus, the extra steps of writing data from the transaction log 621 to the appropriate locations in the secondary location 501b are eliminated. The transactions, which are written to the transaction log at 633, are executed at 635 using the data previously stored in the blocks table 630b through the data pulling process.

Figure 7:
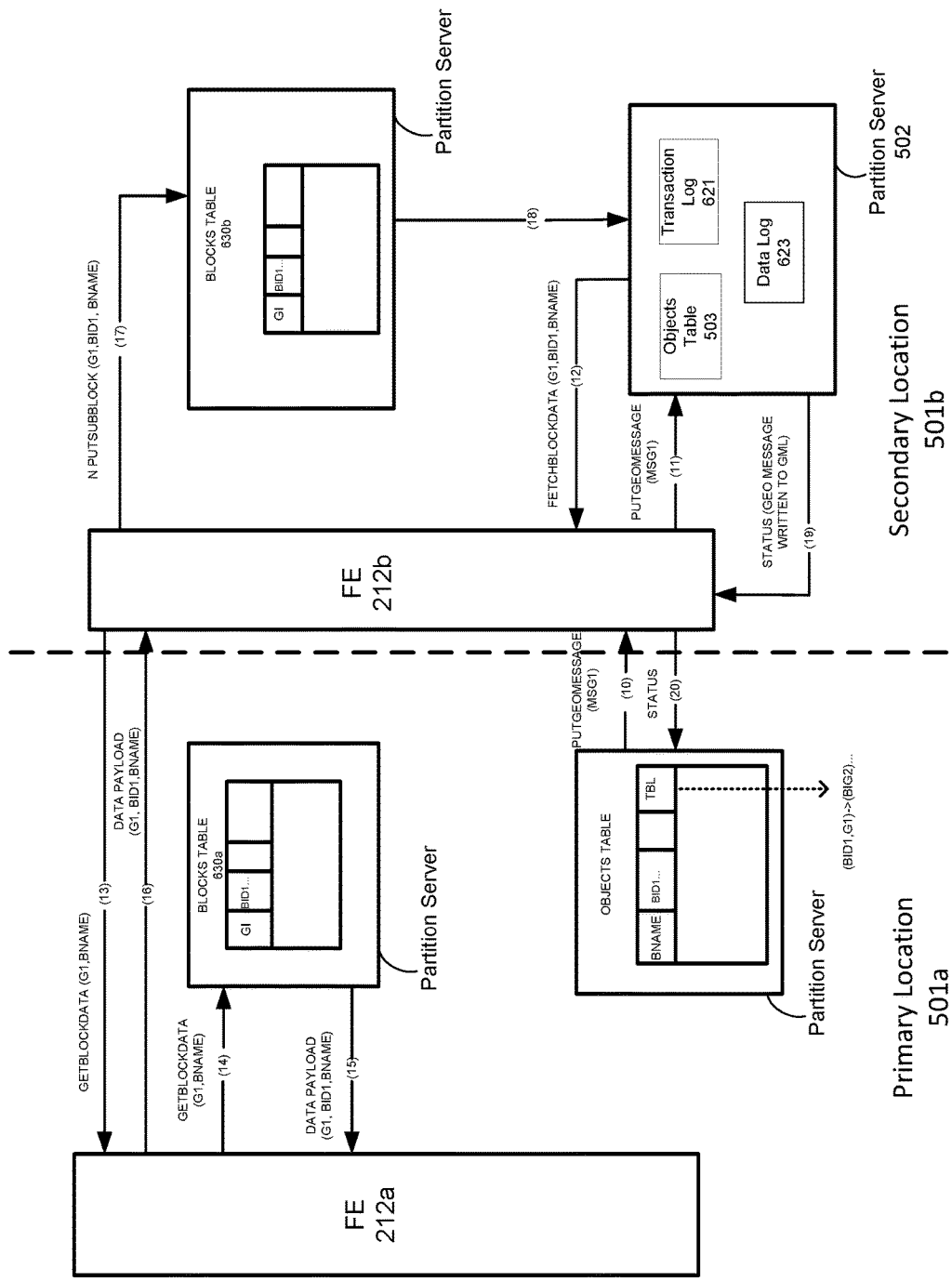
FIG. 7 shows a detailed flow diagram for the data pulling process, according to an embodiment.

FIG. 7 shows a data flow for the data pulling process for geo replication. The data pulling process may be applied to subblocks stored in a blocks table at the primary location 501a, whereby storing subblocks in the blocks table is described above with respect to FIGS. 3 and 4, and the data is pulled to a blocks table at the secondary location 501b. Generally, a pull process instead of a push process is used to write data from a blocks table at the primary location 501*a* to a blocks table at the secondary location 501*b* for geo replication, such as shown in FIG. 6B. In the pull process, before writing metadata, such as the blocklink (i.e., pointer referencing subblock in blocks table), to the transaction log 621, the actual data is pulled from partition servers on the primary location 501*a* and written to partition servers on the secondary location 501*b*.

Referring to FIG. 7, at (10), at the primary location 501*a*, new PutBlockLink transaction records get packed and sent as part of a geo message, which is shown as PUTGEOMESSAGE (MSG1). The new PutBlockLink transaction records that are packed into the geo message may include the "N" PUTSUBBLOCK transactions discussed with respect to step 2 of FIG. 3.

In FIG. 7, at (11), at the secondary location 501*b*, FE 212*b* receives the geo message PUTGEOMESSAGE (MSG1), and sends a put geo message command, shown as PUTGEOMSG (MSG1), to put the geo message in an OT at the secondary location 501*b*. For example, PUTGEOMSG (MSG1) is sent to a partition server 502, at the secondary location 501*b*, which serves the applicable partition of the OT, shown as objects table 503. The transaction records in MSG1 are written to the transaction log 621, e.g., GML. The data for the transactions in MSG1 is pulled from the primary location 501*a* as is further discussed below.

To pull the data for the transaction records, such as the "N" PUTSUBBLOCK transactions, at (12), the partition server 502 sends a command to the FE 212*b* to get the subblocks for the "N" PUTSUBBLOCK transactions identified in the PUTGEOMESSAGE (MSG1). The command is shown as FETCHBLOCKDATA (G1, BID1, BNAME). The FETCHBLOCKDATA may identify the GUIDs and other information for the subblocks to be pulled from the primary location 501*a*. At (13), the FE 212*b* transmits a request (e.g., GETBLOCKDATA (G1, BNAME)) to FE 212*a* at the primary location 501*a* for pulling the actual data that was persisted at the primary location 501*a* under the "N" PUTSUBBLOCK transactions, which are identified in the PUTGEOMESSAGE (MSG1). The request identifies the subblocks in the blocks table, for example, using the GUIDs and the block name.

At (14)-(16), the FE 212*a* gets the subblocks from the blocks table 630*a*. For example, as shown at (14) and (15), a GETBLOCKDATA command identifying the subblock is sent to the blocks table 630*a*, and the requested subblock is received from the blocks table 630*a*. At (16), the FE 212*a* sends the requested subblock to the FE 212*b*. This may be performed for all the subblocks for the "N" PUTSUBBLOCK transactions.

At (17)-(18), the FE 212*b* receives the subblocks, and follows a similar workflow to the one performed on the primary location side, such as by sending N PutSubBlocks to the blocks table partitions serving the subblocks. Upon receiving a completion notification, the partition server serving the applicable blocks table partition writes the data for the N PutSubBlocks to the data log 623.

At (19), the partition server 502 sends a response to the FE 212*b* that the write for the original PutGeoMessageCommand from step 10 is completed, and, at (20), the FE 212*b* sends a status to the partition server at the primary location 501*a* that the original PutGeoMessageCommand from step 10 is completed. Now the transaction log 621 has the transactions and the actual data for the transactions is stored in the data log 623, and the georeplayer 622 in FIG. 6B can execute the transactions. In an example, the data log 623 may include the blocks table 630*b*. In this case, step 18 may be bypassed because the data for the transactions is already stored in its appropriate location at (17), and the georeplayer 622 execute the transactions whose associated block data is already persisted in the blocks table 630*b*.

There are technical advantages to the data pulling process as opposed to the log shipping process for geo replication. For log shipping, on the geo receiver/replayer side, there is a redundant write for the actual block data For example, for log shipping, data is first written to the GML at the secondary location side, and then during replay, the data is read and written to a blob log. For the data pulling process, the initial data write to the GML of the OT that is performed for log shipping is avoided as the actual data is written only once in the blocks table log stream. Also, the data read from the GML during replay is avoided as replay of block links involve only metadata. In addition, the geo sender/receiver throughput is increased, because pull requests can be simultaneously issued to different FEs. Also, faster geo replayer throughput is achieved as there is no actual data write that happens during the replay phase from the GML.

Figure 8:
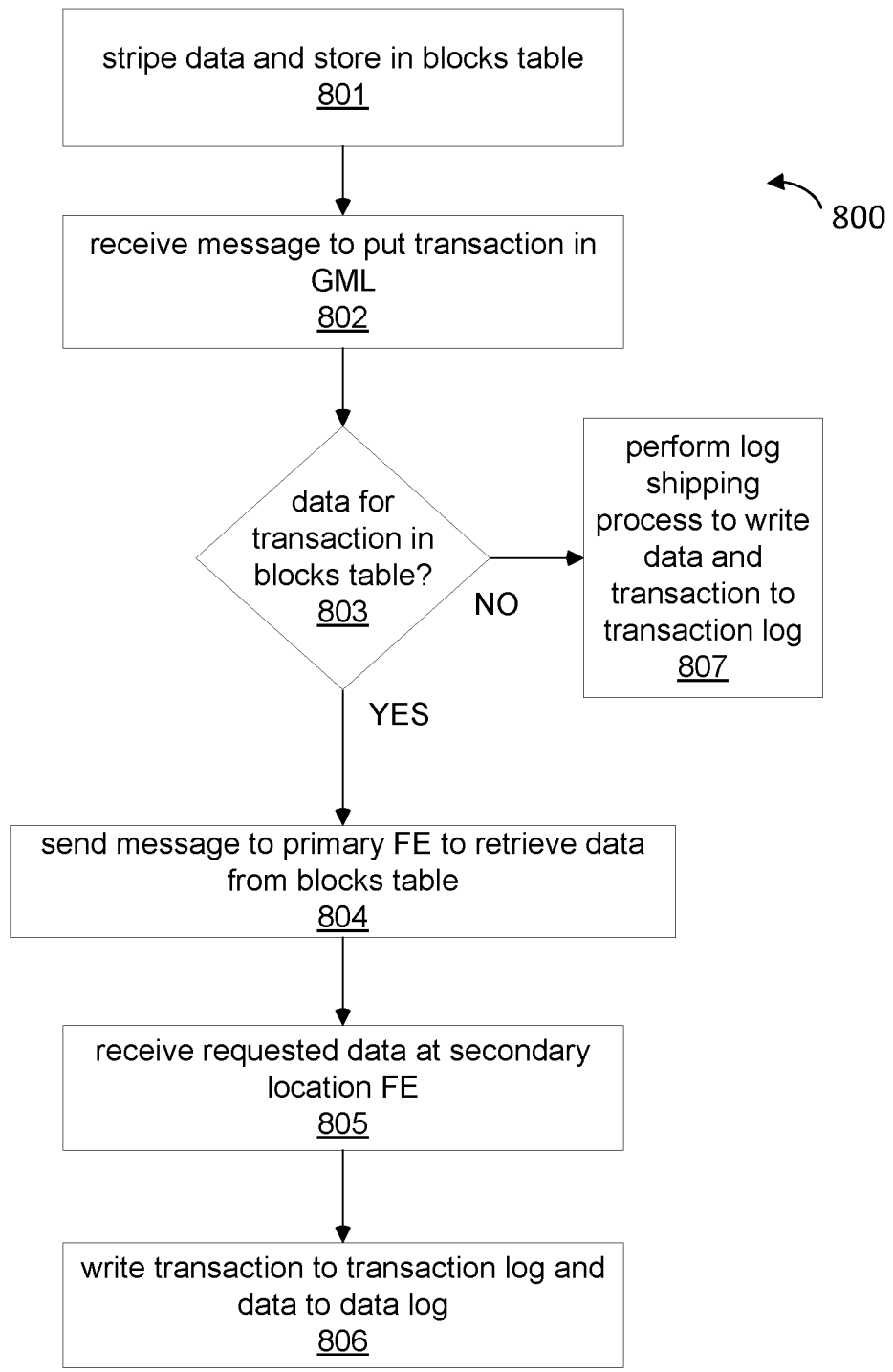
FIG. 8 shows a flow chart for geo replication, according to an embodiment.

FIG. 8 illustrates a method for geo replication. At 801, data, such as data for a blob, is striped and stored in the blocks table on the primary location side, such as described with respect to FIGS. 3 and 4. At 802, a message is received at the FE on the secondary location side to put a transaction in the GML. The FE determines whether the message is for a transaction that includes data stored in the blocks table. For example, the message includes a GUID of the data in the blocks table if it is stored in the blocks table. If the data is in the blocks table, at 803, the data pulling process is performed. For example, at 804, the FE on the secondary location side sends a message to the FE of the primary location side to retrieve the data from the blocks table on the primary location side. The message, for example, includes the GUID of the data in the blocks table and other metadata for the data. At 805, the FE on the secondary location side receives the requested data from the FE on the primary location side, and at 806, the data for the transactions is written to the data log. Also, the transactions are written to the transaction log. The georeplayer can then execute the transactions in the transaction log using the data in the data log, such as shown in FIG. 6B. If it is determined at 802 that the data is not in the blocks table, then the transaction and data for the transaction are written to the transaction log according to a log shipping process at 807, such as shown in FIG. 6A.

Figure 9:
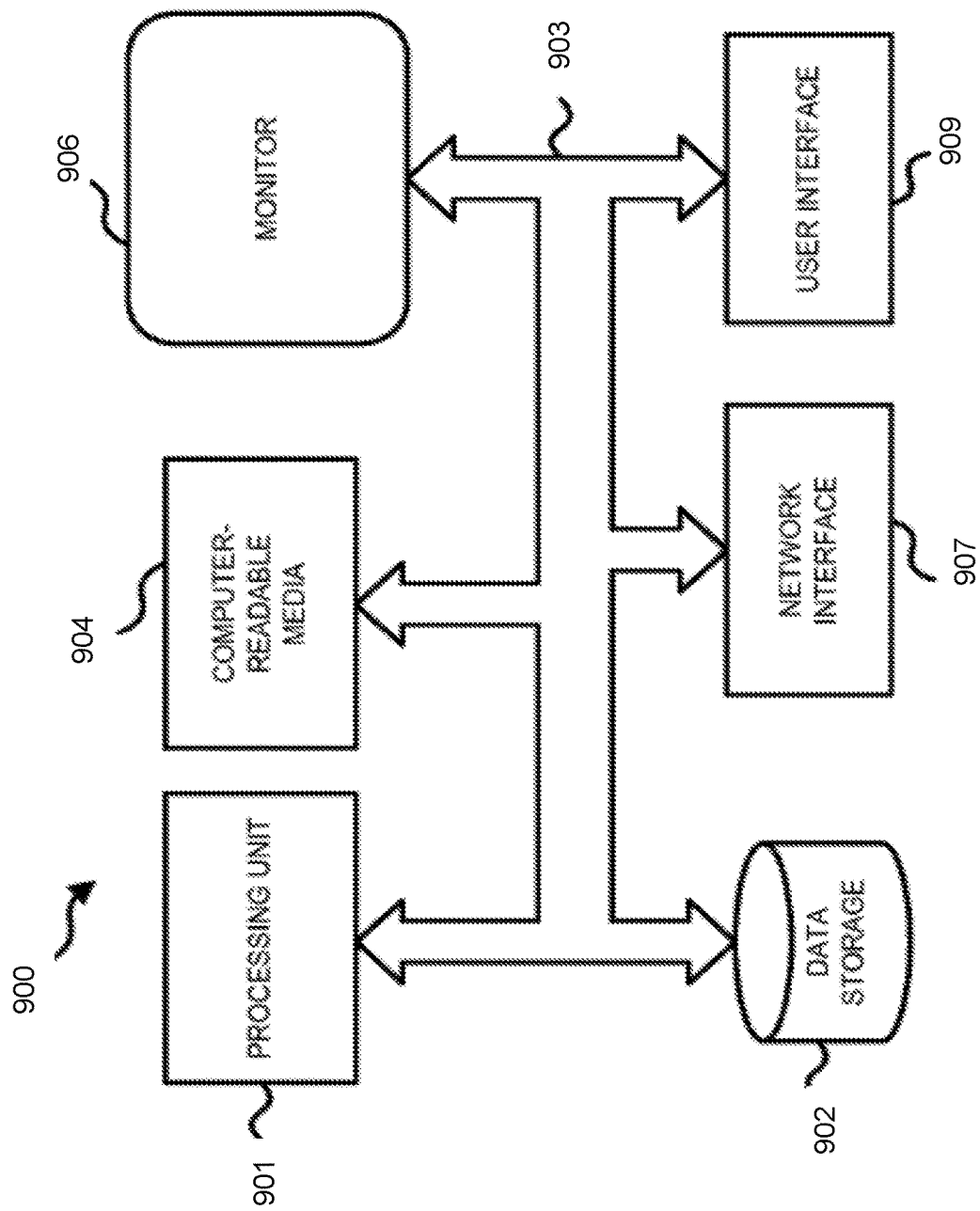
FIG. 9 shows an example of a computing environment, according to an embodiment.

FIG. 9 shows an example of a suitable computing and networking environment on which the examples and embodiments described above may be implemented. The computing system environment is only one example of a suitable computing environment and is not intended to suggest any limitation as to the scope of use or functionality of the examples and embodiments described above. The examples and embodiments described above is operational with numerous other general purpose or special purpose computing system environments or configurations. Examples of well-known computing systems, environments, and/or configurations that may be suitable for use with the examples and embodiments described above include, but are not limited to: personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The examples and embodiments described above may be described in the general context of computer-executable instructions, such as program modules, being executed by a computer. Generally, program modules include routines, programs, objects, components, data structures, and so forth, which perform particular tasks or implement particular abstract data types. The examples and embodiments described above may also be practiced in distributed computing environments where tasks are performed by remote processing devices that are linked through a communications network. In a distributed computing environment, program modules may be located in local and/or remote computer storage media including memory storage devices.

FIG. 9 shows an example of a system for implementing various aspects of the example and embodiments described herein and may include a computing device in the form of a computer 900. Components may include, but are not limited to, various hardware components, such as processing unit 901, data storage 902, such as a system memory, and system bus 903 that couples various system components including the data storage 902 to the processing unit 901. The system bus 903 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 900 typically includes a variety of non-transitory computer-readable media 904. Computer-readable media 904 may be any available media that can be accessed by the computer 900 and includes both volatile and non-volatile media, and removable and non-removable media, but excludes propagated signals. By way of example, and not limitation, computer-readable media 904 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 902 includes computer storage media in the form of volatile and/or nonvolatile memory such as read only memory (ROM) and random access memory (RAM). A basic input/output system (BIOS), containing the basic routines that help to transfer information between elements within computer 900, such as during start-up, is typically stored in ROM. RAM typically contains data and/or program modules that are immediately accessible to and/or presently being operated on by processing unit 901. By way of example, and not limitation, data storage 902 holds an operating system, application programs, and other program modules and program data.

Data storage 902 may also include other removable/non-removable, volatile/nonvolatile computer storage media. By way of example only, data storage 902 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 9, provide storage of computer-readable instructions, data structures, program modules and other data for the computer 900.

A user may enter commands and information through a user interface 909 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 901 through a user interface 909 that is coupled to the system bus 903, but may be connected by other interface and bus structures, such as a parallel port, game port or a universal serial bus (USB). A monitor 906 or other type of display device is also connected to the system bus 903 via an interface, such as a video interface. The monitor 906 may also be integrated with a touch-screen panel or the like. Note that the monitor and/or touch screen panel can be physically coupled to a housing in which the computing device 900 is incorporated, such as in a tablet-type personal computer. In addition, computers such as the computing device 900 may also include other peripheral output devices such as speakers and printer, which may be connected through an output peripheral interface or the like.

The computer 900 may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer 900. The logical connections depicted in FIG. 9 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 900 may be connected to a public or private network through a network interface 907. In some embodiments, a modem or other means for establishing communications over the network. The modem, which may be internal or external, may be connected to the system bus 903 via the network interface 907 or other appropriate mechanism. A wireless networking component such as comprising an interface and antenna may be coupled through a suitable device such as an access point or peer computer to a network. In a networked environment, program modules depicted relative to the computer 900, or portions thereof, may be stored in the remote memory storage device. It may be appreciated that the network connections shown are exemplary and other means of establishing a communications link between the computers may be used.

The computer 900 may be a server or another type of computer. The computer 900 may include a platform for hosting one or more components of the partition layer or the FE layer.

Embodiments and examples are described above, and those skilled in the art will be able to make various modifications to the described embodiments and examples without departing from the scope of the embodiments and examples.

What is claimed is:

1. A computing device in a distributed storage system operable to perform data replication from a primary storage system to a secondary storage system, the computing device comprising:
   at least one memory containing machine-readable instructions; and
   at least one processor to execute the machine-readable instructions to:
      determine whether a block to be replicated from the primary storage system to the secondary storage system is to be replicated via a data pulling process or a log shipping process;
      in response to determining the block is to be replicated through the log shipping process, store a transaction and data for the block in a transaction log, and subsequently execute the transaction from the transaction log to cause the data to be written from the transaction log to a data log in the secondary storage system; and
      in response to determining the block is to be replicated through the data pulling process, store the transaction in the transaction log, retrieve the data for the block from the primary storage system, and store the data in the data log,
         wherein for the data pulling process, the data is stored in the data log without previously storing the data in the transaction log.

2. The computing device of claim 1, wherein the transaction is performed on the primary storage system, and the at least one processor is to receive a message from a computer in the primary storage system to replicate the transaction on the secondary storage system.

3. The computing device of claim 1, wherein to determine whether to replicate via a data pulling process or a log shipping process, the at least one processor is to:
   determine whether the data for the block is stored in a blocks table in the primary storage system, wherein the data is stored in the blocks table in response to the block being striped across a plurality of partitions in the primary storage system.

4. The computing device of claim 3, wherein the block is striped across the plurality of partitions in the primary storage system if a size of the block is greater than a predetermined threshold.

5. The computing device of claim 3, wherein to stripe the block across the plurality of partitions, the primary storage system is to:
   receive a write request for a block at the primary storage system;
   determine whether the block satisfies predetermined criteria;
   in response to the block satisfying the predetermined criteria,
   striping the block across a plurality of partitions in a pool of partitions,
      wherein striping the block across the plurality of partitions comprises storing subblocks and metadata for the subblocks, including globally unique identifiers, in a partitioned blocks tables associated with the plurality of partitions; and
   storing a link to entries for the blocks table in an objects table associated with the block.

6. The computing device of claim 5, wherein a portion of each of the globally unique identifiers is randomly selected for load distribution across the plurality of partitions.

7. The computing device of claim 5, wherein in response to the block not satisfying predetermined criteria, storing the block and its metadata in an objects table.

8. The computing device of claim 7, wherein for the log shipping process the data is retrieved from the objects table in the primary storage system.

9. A computing device in a distributed storage system operable to perform data replication from a primary storage system to a secondary storage system, the computing device comprising:
   at least one memory containing machine-readable instructions; and
   at least one processor to execute the machine-readable instructions to:
      determine whether a block of data to be replicated from the primary storage system to the secondary storage system is striped across a plurality of storage partitions in the primary storage system or is stored in a single storage partition in the primary storage system;
      in response to determining the block is stored in the single storage partition, store a transaction and data for the block in a transaction log in the secondary storage system, and subsequently execute the transaction from the transaction log to cause the data to be written from the transaction log to a data log in the secondary storage system; and
      in response to determining the block is striped across the plurality of storage partitions, store the transaction in the transaction log, retrieve the data for the block from the primary storage system, and store the data in the data log without previously storing the data in the transaction log.

10. The computing device of claim 9, wherein the transaction is performed on the primary storage system, and the at least one processor is to receive a message from a computer in the primary storage system to replicate the transaction on the secondary storage system.

11. The computing device of claim 9, wherein to determine whether a block of data to be replicated from the primary storage system to the secondary storage system is striped across the plurality of storage partitions or is stored in the single storage partition, the at least one processor is to:
   determine whether the data for the block is stored in a blocks table in the primary storage system, wherein the data is stored in the blocks table in response to the block being striped across the plurality of storage partitions.

12. The computing device of claim 11, wherein the block is striped across the plurality of storage partitions in the primary storage system if a size of the block is greater than a predetermined threshold.

13. The computing device of claim 11, wherein to stripe the block across the plurality of storage partitions, the primary storage system is to:
- receive a write request for a block at the primary storage system;
- determine whether the block satisfies predetermined criteria;
- in response to the block satisfying the predetermined criteria,
- striping the block across a plurality of partitions in a pool of partitions,
  - wherein striping the block across the plurality of partitions comprises storing subblocks and metadata for the subblocks, including a globally unique identifiers, in a partitioned blocks tables associated with the plurality of partitions; and
- storing a link to entries for the blocks table in an objects table associated with the block.

14. The computing device of claim 13, wherein a portion of each of the globally unique identifiers is randomly selected for load distribution across the plurality of partitions.

15. A computer-implemented method for replicating data from a first storage system to a second storage system, the method comprising:
- determining whether a block to be replicated from the first storage system to the second storage system is to be replicated via a data pulling process or a log shipping process;
- in response to determining the block is to be replicated through the log shipping process, storing a transaction and data for the block in a transaction log; and
- in response to determining the block is to be replicated through the data pulling process, storing the transaction in the transaction log, retrieving the data for the block from the first storage system, and storing the data in a data log without previously storing the data in the transaction log.

16. The method of claim 15, wherein the transaction is performed on the first storage system, and the method comprises receiving a message from a computer in the first storage system to replicate the transaction on the second storage system.

17. The method of claim 15, wherein determining whether to replicate via a data pulling process or a log shipping process comprises:
- determining whether the data for the block is stored in a blocks table in the first storage system, wherein the data is stored in the blocks table in response to the block being striped across a plurality of partitions in the first storage system.

* * * * *